United States Patent
Head

[19]

[11] Patent Number: 5,915,649
[45] Date of Patent: Jun. 29, 1999

[54] ROADABLE HELICOPTER

[75] Inventor: Robert E. Head, Gilbert, Ariz.

[73] Assignee: McDonnell Douglas Helicopter Company, Mesa, Ariz.

[21] Appl. No.: 08/697,367

[22] Filed: Aug. 23, 1996

[51] Int. Cl.⁶ .................................................. B64C 27/22
[52] U.S. Cl. ........................ 244/7 A; 244/17.17; 244/2; 701/23
[58] Field of Search .................... 244/2, 6, 7 R, 244/7 A, 17.17, 49, 46, 190; 701/23

[56] References Cited

U.S. PATENT DOCUMENTS

| | | | |
|---|---|---|---|
| 2,156,288 | 5/1939 | Holliday | 244/49 |
| 2,427,936 | 9/1947 | Wales, Jr. | |
| 2,554,938 | 5/1951 | Catalano | 244/102 R |
| 2,562,492 | 7/1951 | Hall et al. | 244/2 |
| 2,563,731 | 8/1951 | Masterson | 244/2 |
| 3,112,088 | 11/1963 | Speechley | 244/2 |
| 3,116,896 | 1/1964 | Sigler et al. | 244/2 |
| 3,261,572 | 7/1966 | Gorton | 244/2 |
| 3,750,982 | 8/1973 | Gear | 244/17.11 |
| 4,634,110 | 1/1987 | Julich et al. | 364/186 |
| 5,067,674 | 11/1991 | Heyche et al. | 244/190 |
| 5,195,039 | 3/1993 | Gold et al. | 244/17.13 |
| 5,203,520 | 4/1993 | Przygodski et al. | 244/2 |
| 5,239,468 | 8/1993 | Sewersky et al. | 364/424.03 |
| 5,295,643 | 3/1994 | Ebbert et al. | 244/7 B |
| 5,337,976 | 8/1994 | Derrien | 244/102 A |
| 5,459,666 | 10/1995 | Casper et al. | 364/442 |
| 5,505,407 | 4/1996 | Chiappetta | 244/2 |
| 5,610,815 | 3/1997 | Gudat et al. | 701/23 |

*Primary Examiner*—V. Lissi Mojica
*Attorney, Agent, or Firm*—Snell & Wilmer L.L.P.

[57] ABSTRACT

A roadable helicopter according to various aspects of the present invention comprises a vehicle that drives like a conventional car in its road configuration, and converts to fly like a helicopter in its flight configuration. The operator of the helicopter only needs to press a button to initiate the conversion from one configuration to the other. To facilitate the flight configuration, the helicopter is preferably equipped with a dual, coaxial counterrotating rotor system to provide lift, propulsion, and control in the flight configuration. In the road configuration, however, the rotor system automatically folds into a rotor bay formed in the rear of the helicopter. The roadable helicopter may also include an automatic control/stability/navigation system that permits fully automatic flight.

23 Claims, 12 Drawing Sheets

ROADABLE HELICOPTER

BACKGROUND OF THE INVENTION

1. Field of the Invention

The invention generally relates to multipurpose vehicles, and more particularly, to vehicles that are configured to travel by both air and land.

2. Description of the Related Art

Since shortly after the invention of the first aircraft, the flying automobile has been pursued as the next generation of revolutionary vehicle. A flying automobile, frequently referred to as a roadable aircraft, has usually been envisioned as a "fixed wing" aircraft. A few concepts, however, include rotary wings and operate as autogyro type aircraft with an autorotating rotor providing lift, and powered propellers delivering forward thrust when the craft is airborne for forward flight. The autogyro rotor is typically powered for a short time to allow a jump takeoff.

Over the last fifty years, several concepts have emerged for implementing roadable aircraft. Some concepts were implemented as flying prototypes, and in a few cases, even received regulatory approval, such as from the now-superseded Civil Aeronautics Administration. No such roadable aircraft, however, has achieved any significant economic success in either the commercial or the military market for several reasons. For example, existing concepts of flying automobiles, being predominantly fixed wing aircraft, require at least a minimum-length runway to take off and land. Consequently, such vehicles require access to an airport or comparable facility to fly. The necessity of runway facilities eliminates many of the advantages of roadable aircraft, particularly the ability to take off and land at remote and random locations.

In addition, fixed wing roadable aircraft almost exclusively derive lift from the fixed wing and propulsion from an engine/propeller combination. To make road travel practical, the wing and propeller must be removed or repositioned. Various designs propose leaving these components at the airport, towing them behind the vehicle like a trailer, or folding or retracting them into the body of the car. Each of these configurations suffers the problem of either not providing an appropriate method of retracting and housing the wing and propeller in the body of the vehicle or requiring the removal of the propeller or wing. Assembling and removing the wing and propeller is an inconvenient, time-consuming process. In addition, aircraft regulating authorities, such as the Federal Aviation Administration, typically disapprove of any activities that involve assembling or disassembling structurally necessary aircraft components by any person other than a licensed Aircraft and Powerplant (A and P) mechanic. This further complicates the process of removing and reattaching the wing and propeller assembly, thus increasing the cost and inconvenience of the roadable aircraft.

In addition to conventional fixed-wing concepts, roadable, jump-takeoff autogyro-type vehicles have been implemented. These vehicles require shorter runways than conventional fixed wing aircraft, and are therefore preferable in many applications. Like fixed wing aircraft, however, autogyro aircraft cannot hover. As a result, autogyro-type roadable aircraft are similarly restricted to minimum-length runway sites. In addition, these aircraft also suffer the problems associated with removing and folding the rotary wing and propeller while the craft is in the road configuration.

In sum, previously developed concepts for roadable aircraft fail to effectively fulfill several practical requirements. A successful roadable aircraft should not require runway facilities, should be easy and quick to use, and should require no special training to convert between road and flight configurations.

SUMMARY OF THE INVENTION

A roadable aircraft according to various aspects of the present invention comprises an automobile that converts automatically to a helicopter. In particular, this vehicle has two configurations, a road configuration and a flight configuration. In the flight configuration, a rotor system, such as a dual coaxial rotor system, provides lift and trust. En the road configuration, the rotor system folds and retracts into a rotor bay formed in the body of the vehicle for operation like a conventional automobile. The process for converting the vehicle from one configuration to the other is preferably automatic, requiring relatively little action from the operator. In addition, the roadable aircraft is suitably equipped with an automatic navigation and control system to maintain stable flight and substantially eliminate the need for a pilot.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which:

DETAILED DESCRIPTION OF THE EXEMPLARY EMBODIMENTS

Figure 1:
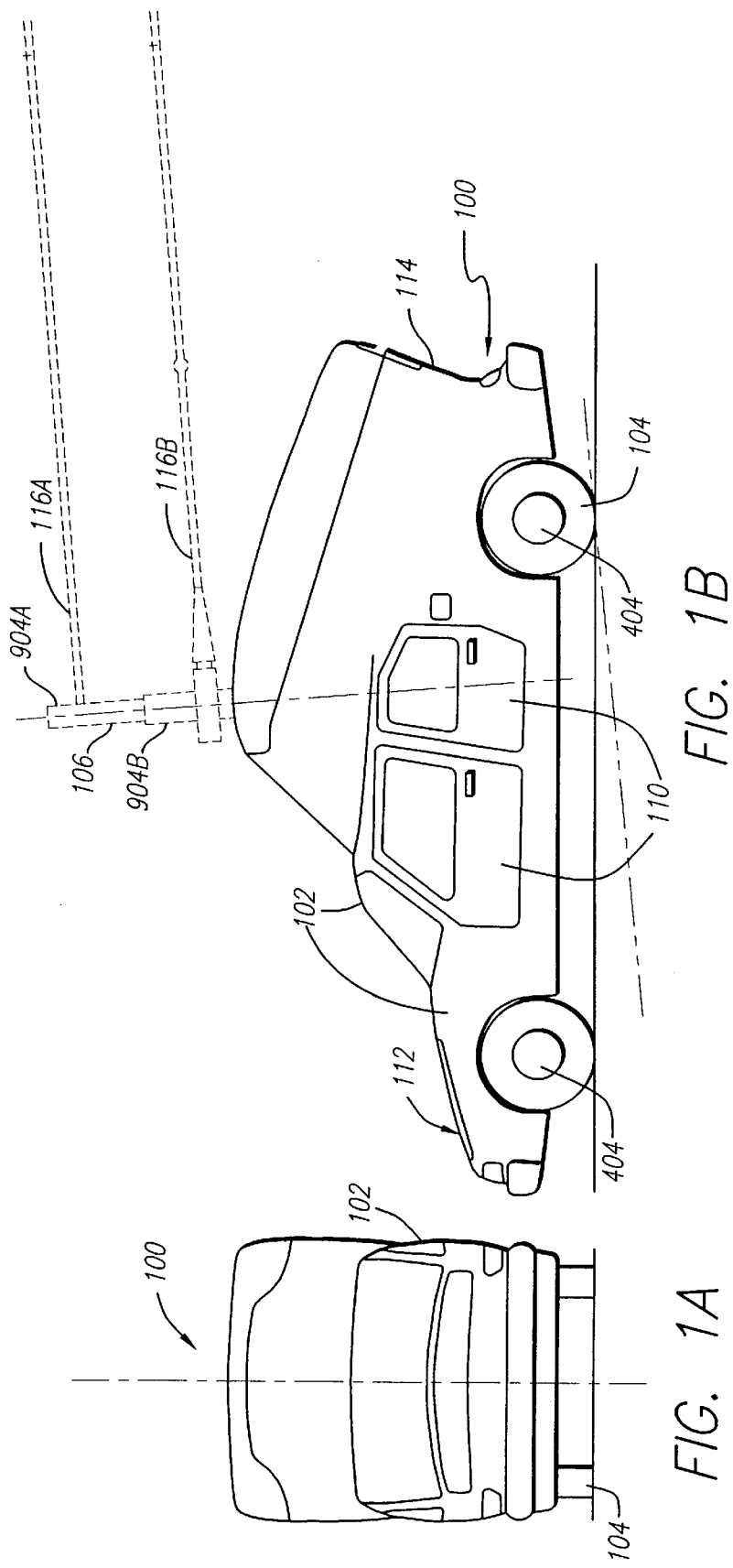
FIGS. 1A and 1B are front and elevational views, respectively, of a roadable helicopter according to various aspects of the present invention.
Figure 2:
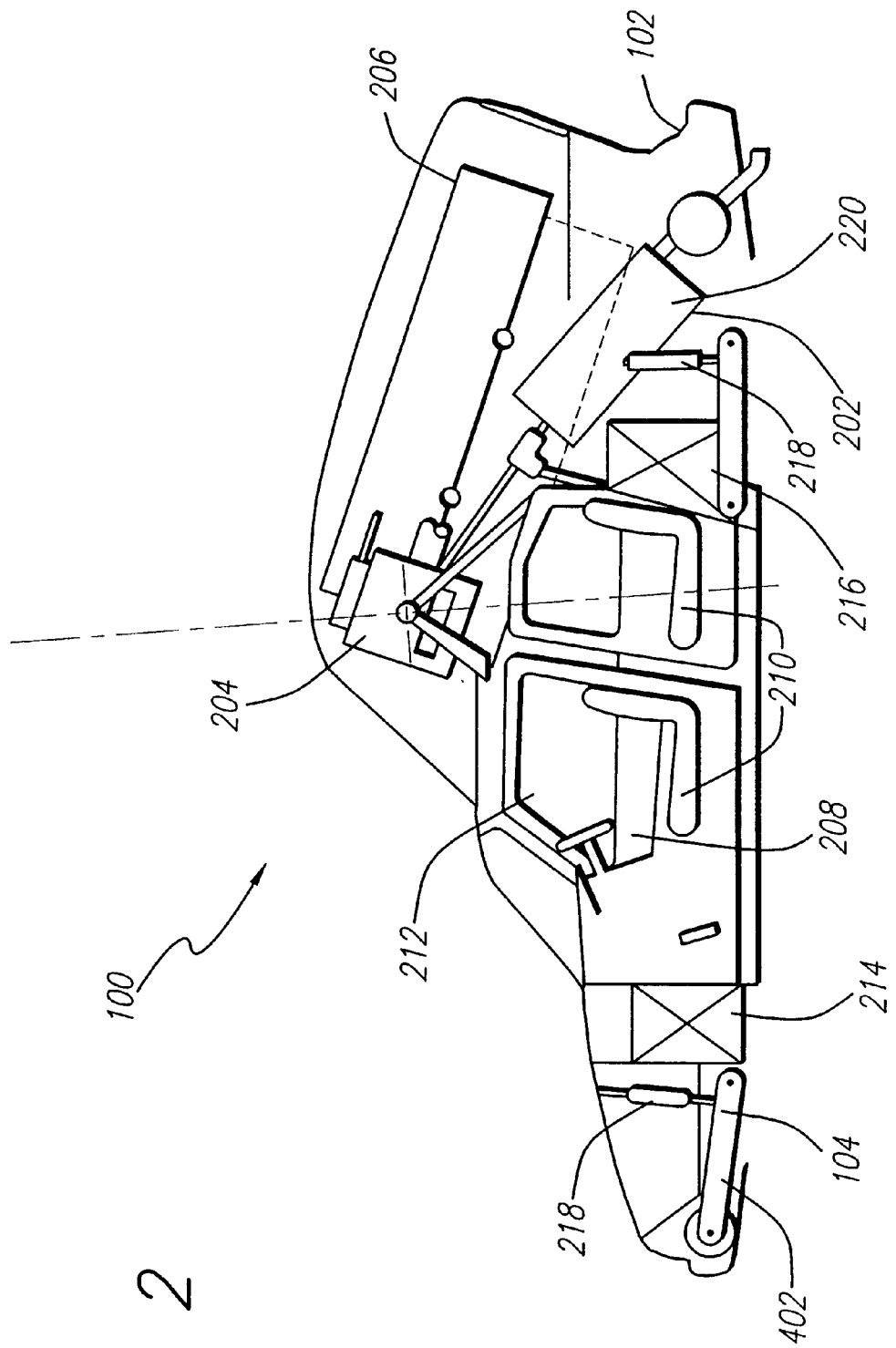
FIG. 2 is a cross-sectional view of the roadable helicopter of FIG. 1.
Figure 3:
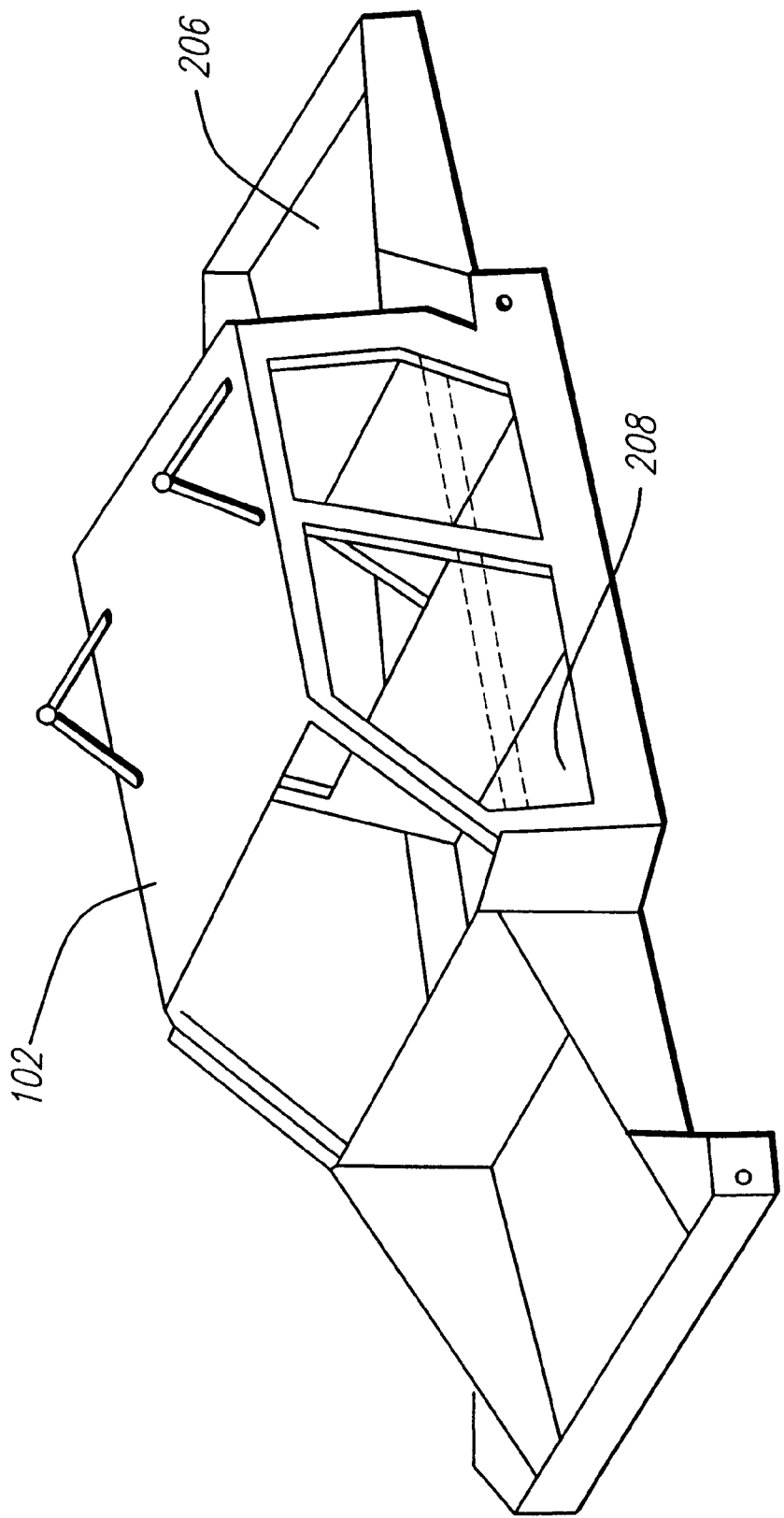
FIG. 3 is an oblique view of a vehicle body of the roadable helicopter of FIG. 1.

A roadable helicopter according to various aspects of the present invention is configured to convert from a road configuration, in which it operates like a conventional automobile, to a flight configuration, in which it operates like a helicopter. The conversion between the two configurations is preferably performed automatically, requiring relatively little input from the driver/pilot. Referring now to FIGS. 1A–B, FIG. 2, and FIG. 3, roadable helicopter 100 according to various aspects of the present invention suitably comprises: a vehicle body 102; a landing gear assembly 104 mounted on the bottom of vehicle body 102; a rotor system 106 for providing lift; a power plant 202 for driving rotor system 106 when roadable helicopter 100 is in flight configuration and driving wheels associated with landing gear 104 when in road configuration; and a transmission system 204.

Vehicle body 102 provides the general frame and shape of roadable helicopter 100. Vehicle body 102 preferably includes a frame of suitably strong, lightweight materials, such as various composite materials, for optimal efficiency, roadworthiness, and airworthiness. In road configuration, roadable helicopter 100 suitably operates in a manner substantially identical to that of a modern luxury automobile, and has essentially the same planform dimensions as a luxury car so that it may readily drive and park with conventional automobiles. To minimize lightning and high-intensity radiated field (HIRF) effects, vehicle body 102 also suitably includes an external, molded-in, electrically-conducting shell. Vehicle body 102 and seats within vehicle body 102 are also preferably designed according to current safety specifications to protect the passengers in the relevant crash scenarios specified by the various regulatory authorities for both rotorcraft and automobiles.

Vehicle body 102 suitably includes a rotor bay 206; a passenger cabin 208; and a control system (not shown). Rotor bay 206 is suitably situated near the rear of vehicle body 102 and houses rotor system 106 when roadable helicopter 100 is in road configuration. Rotor bay 206 is suitably equipped with doors formed in its top surface, preferably electronically actuated, which automatically open and close to allow rotor system 106 to be extended from and retracted into rotor bay 206.

Passenger cabin 208 is suitably configured to provide seating area for passengers and facilitate operation and guidance of roadable helicopter 100 by a pilot/driver. For example, passenger cabin 208 may be configured as a four passenger compartment 212 having a seating area 210 for four people and four doors 110 for easy access to roadable helicopter 100. In addition, passenger cabin 208 is preferably equipped with various amenities associated with private automobiles and aircraft, such as heating, ventilation, air conditioning, seat belts, shoulder straps, air bags, lights, mirrors, adjustable pilot seat, and luggage compartments. A forward luggage compartment 112 and an aft luggage compartment 114 may be provided to allow loading according to center of gravity requirements. A forward fuel cell 214, an aft fuel cell 216, and a computer-controlled fuel management system (not shown) are also suitably incorporated into vehicle body 102 to maintain the fuel balance around roadable helicopter's 100 center of gravity.

Vehicle body 102 is suitably equipped with a full range of controls to facilitate operation of roadable helicopter 100 in either road or flight configuration. For example, the controls for road configuration suitably include human interfaces in passenger cabin 208 for conventional automotive controls, including, for example, steering wheel, service and parking brake pedals, throttle pedal, transmission gear selector, instruments, switches for engine starter, headlights, parking lights, windshield washer/wiper, cabin lights, instrument lights, environmental control, entertainment radio, and the like. Appropriate advisory, caution, and warning indicators are also suitably provided. The controls for flight configuration suitably further include a configuration selector, such as a switch, engine starting switches, and instrument and light controls.

Roadable helicopter 100 is further suitably equipped with a control system for managing and maintaining the flight and ground operation of roadable helicopter 100. The control system suitably includes links to all of the necessary, conventional guidance systems, including the wheels and blade pitch actuators. In one embodiment, the control system includes an automatic stability/control/navigation (SCN) system (not shown). In the present embodiment, the SCN system suitably eliminates the need for the conventional fixed horizontal and vertical tail surfaces. The SCN system suitably includes a series of redundant and highly reliable sensors and processors to drive the flight system actuators that are, as described in greater detail below, redundant electric actuators designed to maintain the stability of roadable helicopter 100 while in flight. For example, the SCN system suitably includes various accelerometers and rate sensors to sense the movement of roadable helicopter 100, and a computer system which receives information from the sensors and provides signals to roadable helicopter's 100 guidance systems, such as roadable helicopter's 100 cyclic and collective pitch controls, to control roadable helicopter 100.

The SCN system further suitably includes an automatic navigation and guidance system, including, for example, a redundant GPS receiver and a navigational computer. The SCN system suitably performs functions similar to those of a conventional autopilot that keeps an aircraft flying in a safe manner, and of a navigation system, such as displaying a moving map like those used in military aircraft and civilian transports. GPS receiver provides substantially constant and precise information from which the position of roadable helicopter 100 may be established. The computer system suitably operates in conjunction with the information received from the GPS receiver to establish the position of roadable helicopter 100 and, in flight configuration, operate the flight controls to automatically guide roadable helicopter 100 to its destination. Roadable Helicopter 100 may further include a memory of high obstructions to be avoided. In addition, roadable helicopter 100 may be further equipped to electronically interrogate nearby aircraft and cooperatively adjust its flight path to avoid collisions. For example, roadable helicopter 100 may use a system comparable to the conventional terminal area collision avoidance system. A suitable rotor control system may be based on systems developed and fielded by the Kamov Design Bureau in Russia.

In addition to controls including the SCN system, roadable helicopter 100 may be equipped with pilot controls for manually piloting roadable helicopter 100 in flight configuration. For example, a conventional four-axis manual side-arm flight controller may be provided in some configurations as an optional accessory to allow manual flight control by competent licensed pilots. Cyclic and collective pitch controls, similar to those employed on other helicopters, may be provided. The manual controls suitably operate in conjunction with the SCN system, which uses information from the manual controls to control the flight of roadable helicopter 100 accordingly. All of the manual controls may be removable for driving on the road, or permanently installed, to be activated only in flight configuration, for manual control of roadable helicopter 100 in flight.

Figure 4A:
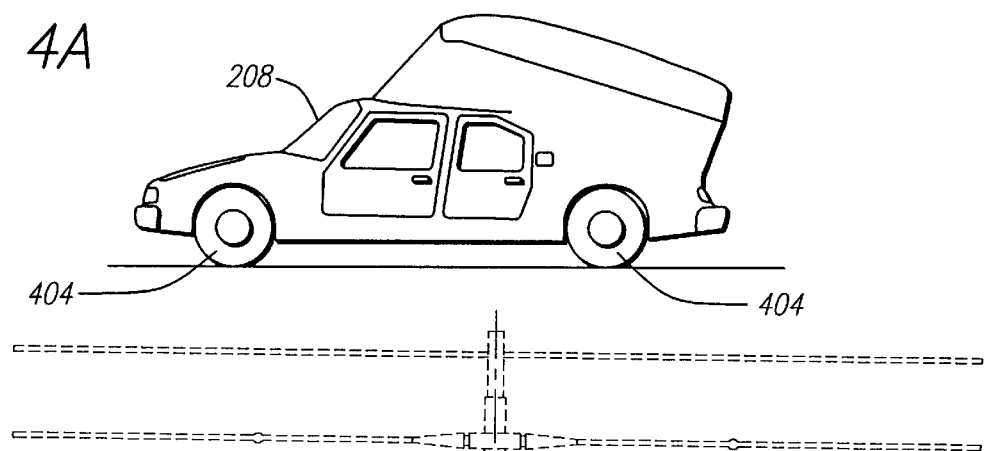
FIGS. 4A–4D are elevational views of the roadable helicopter of FIG. 1 depicting the landing gear in various modes.
Figure 4B:
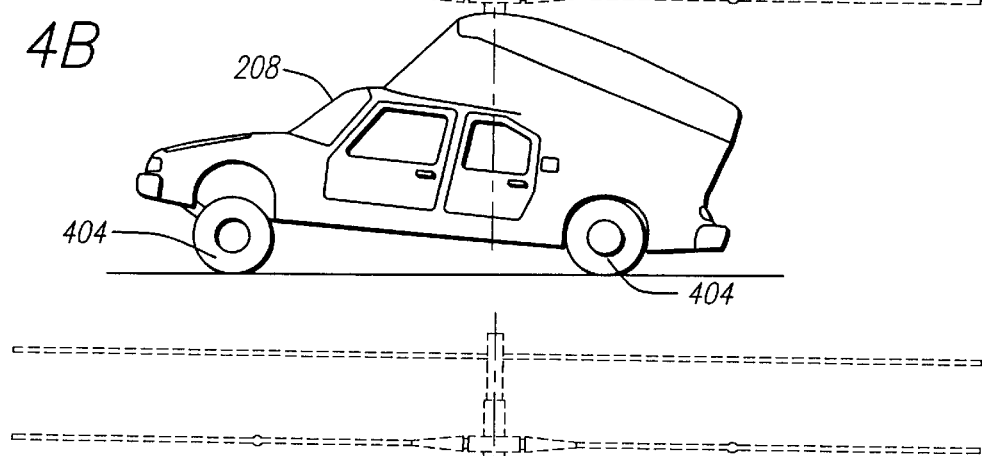
Figure 4C:
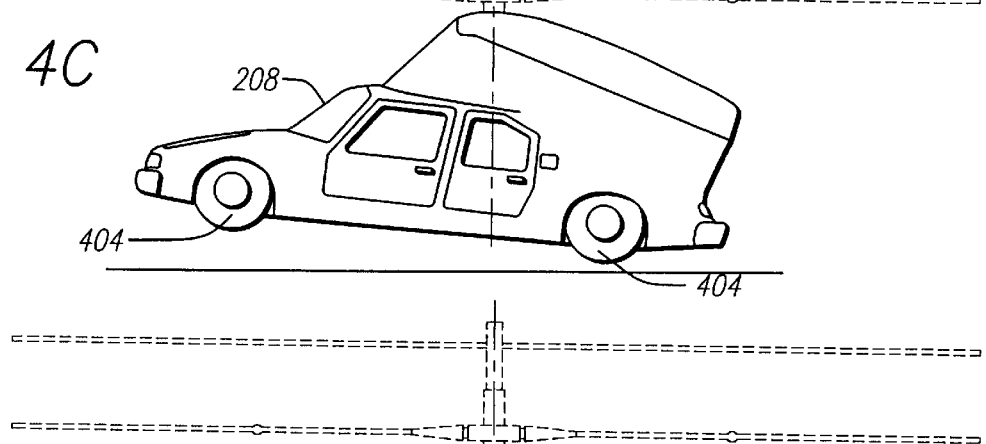

Landing gear 104 comprises any suitable equipment for supporting roadable helicopter 100 on the ground during takeoff and landing, and for providing traction and steering in road configuration. Landing gear 104 suitably performs four functions: position the fuselage parallel to the ground for automobile operation and provide a comfortable ride in the road configuration through an automobile shock-absorbing function, prevent ground resonance when roadable helicopter 100 is taking off or landing, tilt vehicle body 102 nose-up on the ground to position rotor system 106 in the appropriate position relative to the ground for roadable helicopter 100 takeoff and landing operations, and serve as a primary energy absorber in hard vertical landings. Referring now to FIGS. 2 and 4A–D, landing gear 104 suitably includes a trailing arm type assembly 402 on which a plurality of wheels 404 are mounted. At least one of the wheels, for example both of the front wheels, is a drive wheel which provides powered ground motion for roadable helicopter 100 in road configuration. Landing gear 104 is suitably configured to provide a ride comparable to that of a conventional luxury automobile. Dual electric actuators (not shown) suitably operate the steering mechanism for the front wheels. All four wheels are equipped to respond to a service brake and a parking brake, and suitably incorporate an anti-lock brake system (ABS). In flight configuration, landing gear 104 is preferably configured to minimize ground resonance while roadable helicopter 100 is on the ground and rotors are rotating. Further, wheels 404 may be at least partially To retractable upon takeoff to minimize drag in cruise flight (FIG. 4C). facilitate takeoff and landing, landing gear 104 is also suitably equipped to convert the position of roadable helicopter 100 from a first position in road configuration to a second position for taking off and landing. For example, in road configuration, landing gear 104 is preferably configured so that roadable helicopter 100 is substantially parallel to the ground (FIG. 4A). When converting to flight configuration, however, front wheels 404 suitably extend away from passenger cabin 208 to tilt the nose of roadable helicopter 100 upwards so that the rotation plane of rotor system 106 is parallel to the ground (FIG. 4B). Thus, when roadable helicopter 100 is airborne, passenger cabin 208 remains substantially parallel to the ground while rotor system 106 is tilted forward to provide forward thrust and propel roadable helicopter 100 forward. Similarly, when the helicopter is landing, front wheels 404 of landing gear 104 remain extended so that rotors remain parallel to the ground as roadable helicopter 100 settles onto the ground. When roadable helicopter 100 has completed its landing and is returning to road configuration, front wheels 404 then partially retract to return vehicle body 102 to a position parallel to the ground.

Figure 4D:
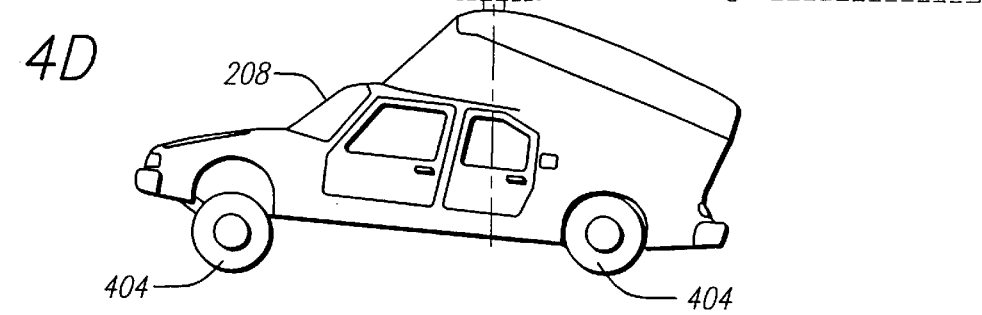

In addition, landing gear 104 may be equipped to absorb energy in the event of a hard vertical landing. For example, all four wheels of landing gear 104 suitably extend away from vehicle, but remain configured so that the bottom of each wheel 404 remains in a plane substantially parallel to rotor system 106 to ensure that all four wheels 404 contact the ground substantially simultaneously (FIG. 4D). In addition, landing gear 104 is preferably configured to actively respond to hard landings in this mode. For example, landing gear 104 may be equipped to sense an approaching hard landing, for example by a device similar to a radar altimeter, and then operate with active, computer-controlled shock struts 218 to actively respond to hard contact with the ground.

Power plant 202 provides power to drive rotor system 106 and wheels 404 of landing gear 104. Power plant 202 suitably comprises any source of power that provides sufficient power to rotor system 106 or to landing gear 104/wheels 404 to propel roadable helicopter 100. For example, power plant 202 suitably includes multiple engines 220, such as two engines, to generate power for roadable helicopter 100. Multiple engines 220 suitably provide their combined power for flight configuration, but roadable helicopter 100 may be configured so that in road configuration, only one engine 220 drives wheels 404, which typically requires much less power. In addition, power plant 202 may be equipped with a power governor to limit the power engine 220 can deliver in road configuration. This reduction of the amount of power supplied by typical aircraft engines may be desired because they typically produce excessive power for automotive applications. Engines 220 suitably comprise shaft turbine engines, though reciprocating or rotary engines may be preferable in various applications because of their relatively quick response to throttle variations.

Figure 5:
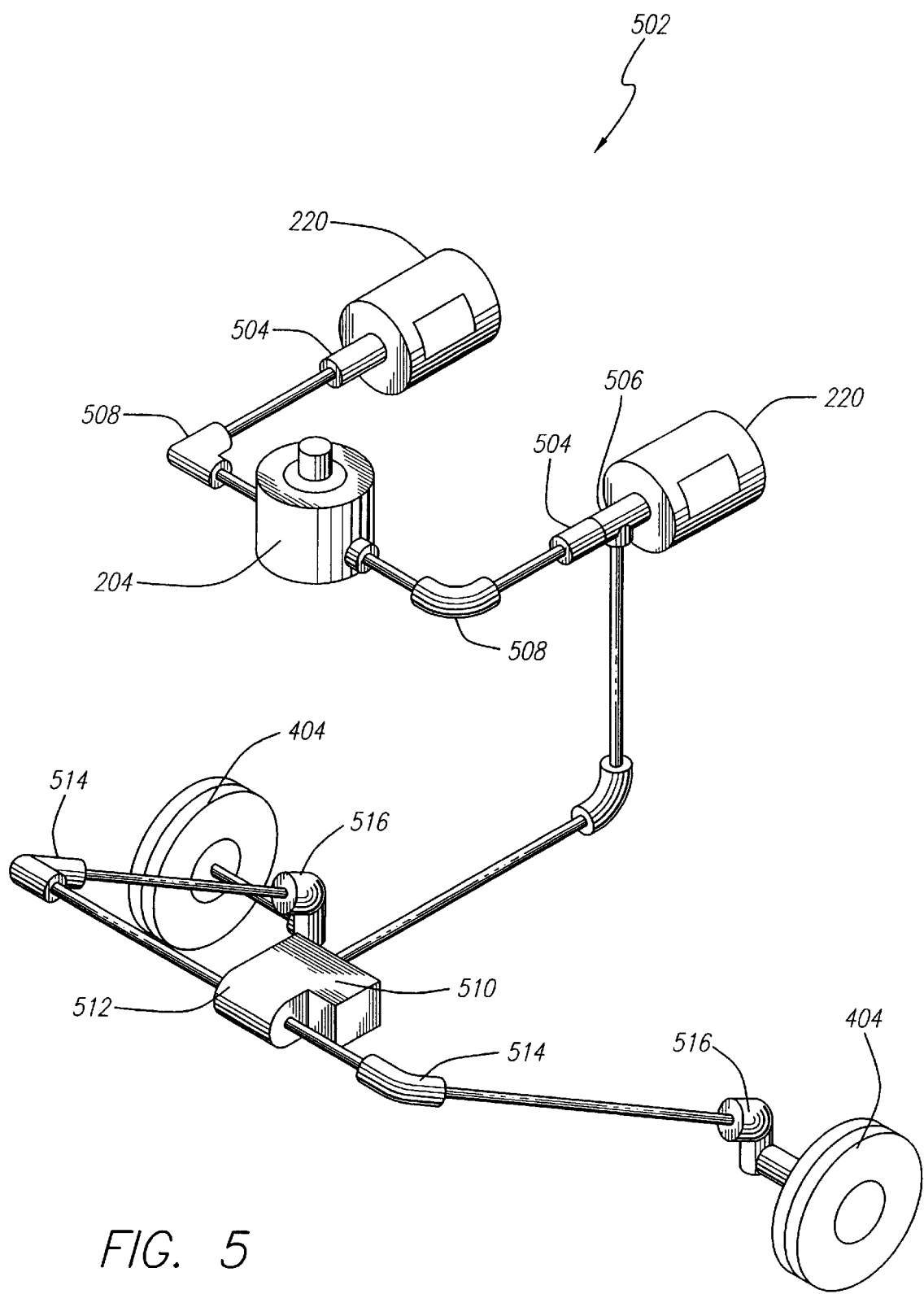
FIG. 5 is an oblique view of a power train system for transferring power from a power plant to a rotor system and the landing gear/wheels.

Power plant 202 also suitably includes a power train 502 to transfer power from engines 220 to rotor system 106 and landing gear 104/wheels 404. An exemplary power train 502, shown schematically in FIG. 5, suitably comprises a pair of clutches 504, such as overrunning jaw clutches, connected to the drive shafts of engines 220, to control the engagement and disengagement of engines 220 to the rest of power train 502. One of the engines 220 is also suitably equipped with a power selector 506, which is responsive to the configuration selector in passenger cabin 208 to select whether the power from engine 220 is provided to rotor system 106 or to wheels 404. Power train also suitably includes a mechanism for delivering power to rotor system 106 and wheels 404, such as a series of right angle gearboxes 508. Power is suitably delivered from both engines 220 through two of right angle gearboxes 508 to deliver power to rotor transmission system 204.

In addition, power may selectably be delivered to wheels 404 through a wheel transmission 510 and a differential 512. Power from transmission 510 and differential 512 is provided to a pair of swinging arm right angle gearboxes 514, and then to a pair of right angle gearboxes and steering swivels 516 to facilitate steering via front wheels 404. Thus, power is delivered to turn drive wheels 404 and facilitate steering of roadable helicopter 100. In road configuration, roadable helicopter 100 is preferably configured for front wheel drive to enhance the balance of drive system's weight about the rotor center. Other arrangements, however, such as rear-wheel or four-wheel drive, may prove to be suitable or even preferable for many applications.

Figure 6:
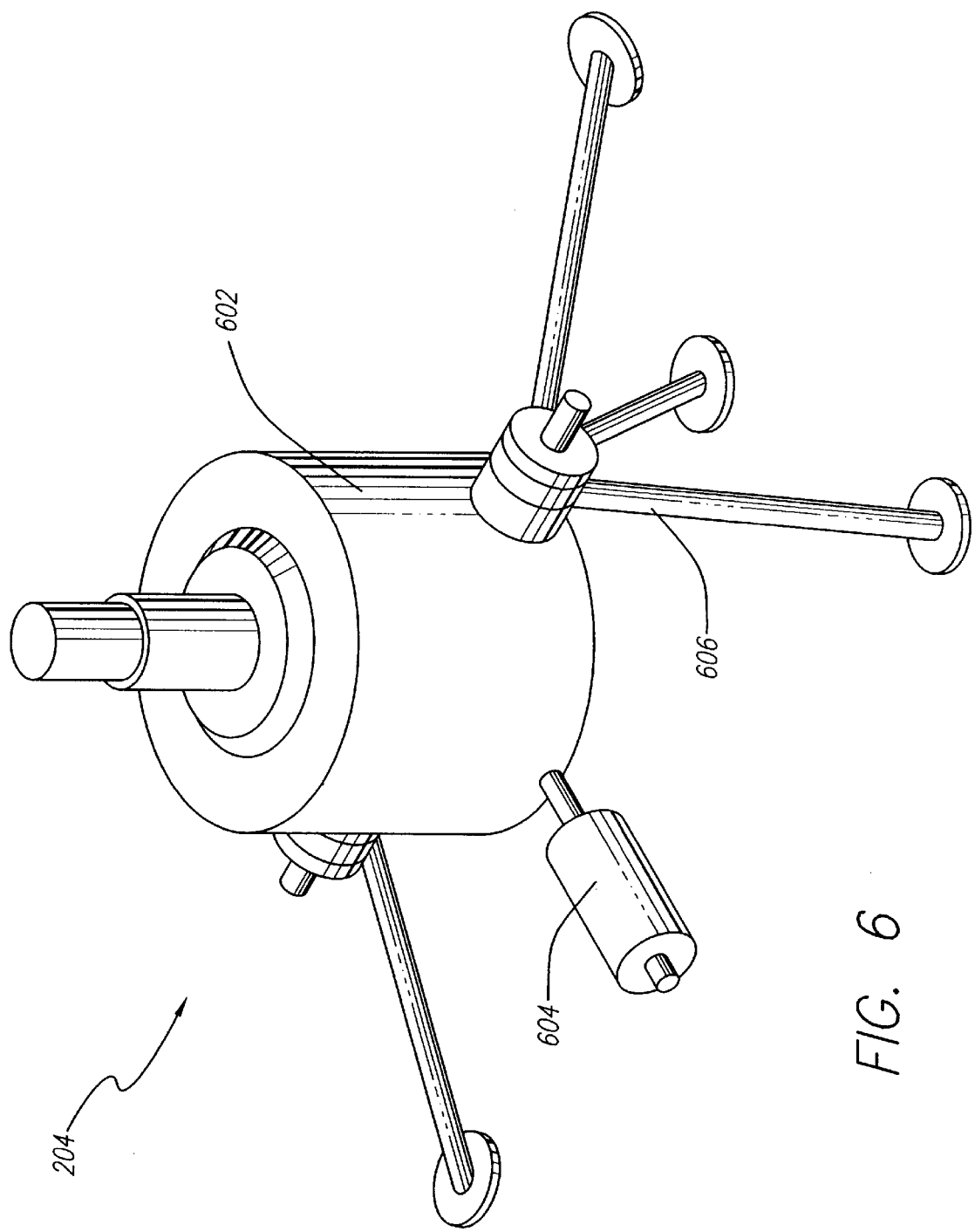
FIG. 6 is an oblique view of a rotor trunnion for encasing a power transfer mechanism and pivotably supporting the rotor system.

Rotor system 106 is driven by power plant 202 through transmission system 204, which is connected to engines 220 through power train 502. Transmission system 204 facilitates transfer of power from power train to rotor system 106. Referring now to FIG. 6, transmission system 204 suitably comprises a rotor trunnion 602; a retraction actuator 604; and a trunnion mount 606. Trunnion mount 606 is substantially rigidly mounted on vehicle body 102 and supports rotor trunnion 602. Rotor trunnion 602 is suitably pivotably mounted on trunnion mount 606 to allow trunnion 602 to pivot rotor system 106 into rotor bay 206 when roadable helicopter 100 is in road configuration and into flight position when in flight configuration. The rotation of rotor trunnion 602 on trunnion mount 606 is controlled by retraction actuator 604. Retraction actuator 604 is suitably connected between vehicle body 102 and rotor trunnion 602. In a first position, retraction actuator 604 rotates rotor trunnion 602 into a flight position, for example, such that rotor system 106 is angled forward with respect to vehicle body 102. In a second position, rotor actuator 604 rotates rotor trunnion 602 into a position for road travel, for example, such that rotor system 106 drops into rotor bay 206. Retraction actuator 604 is suitably automatically operable in conjunction with the automatic conversion procedure as described below.

Rotor trunnion 602 suitably supports rotor system 106 and transfers power from power train 502 to rotor system 106. Rotor trunnion 602 may include a suitable power transfer system 702, described in greater detail below, which is connected to power train 502 and rotor system 106. Rotor trunnion 602 also suitably includes flight control actuators for facilitating control of rotor system 106 according to signals received from the various control systems.

Figure 7:
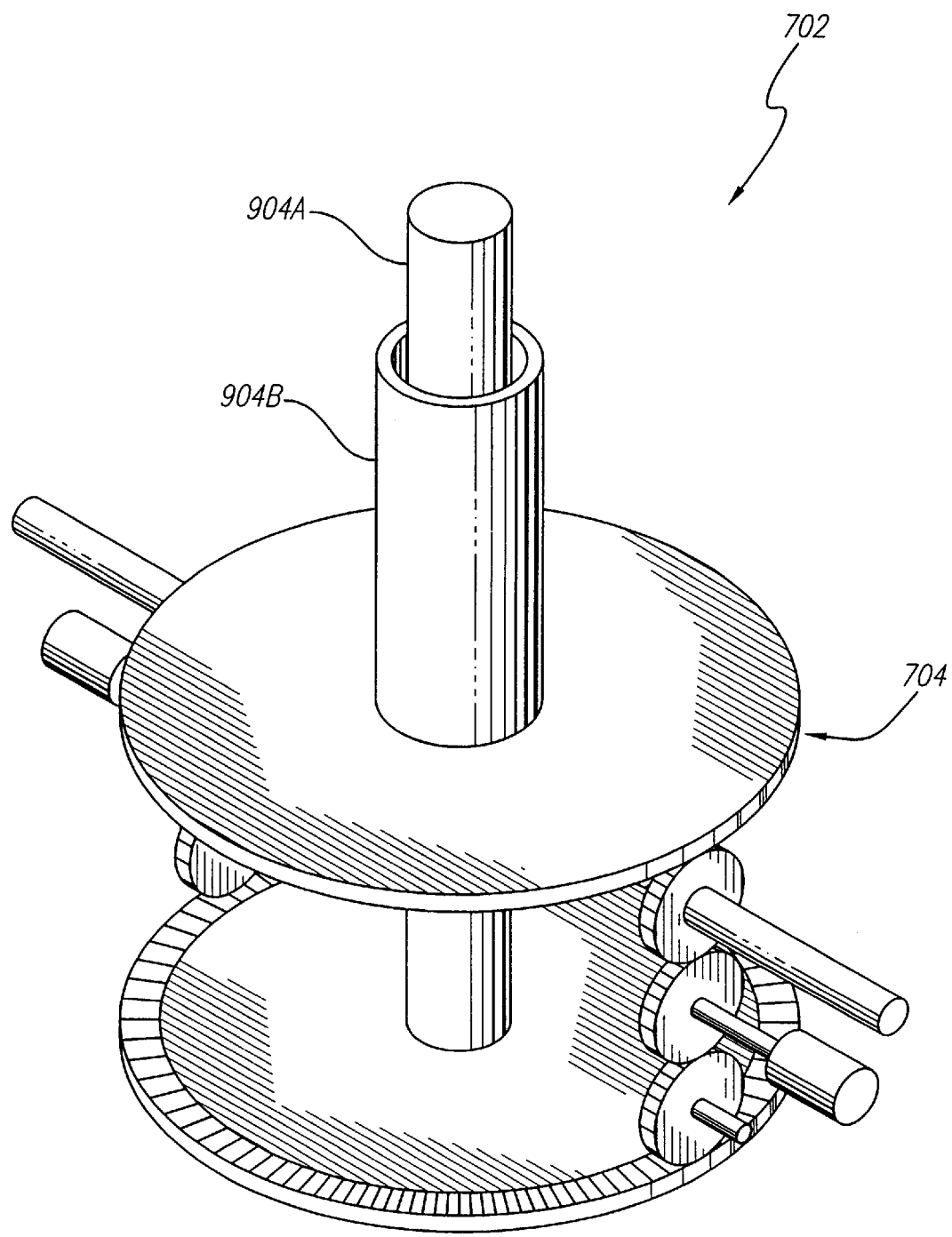
FIG. 7 is an oblique view of a face gear system for transferring power from the power train to the rotor system.

Referring now to FIG. 7, power transfer system 702 comprises any suitable system for transmitting power from power train 502 to rotor system 106. For example, power transfer system 702 suitably comprises a conventional gear system in a gearbox for transferring power to rotor system 106. In the preferred embodiment, however, power transfer system 702 suitably comprises a face gear system 704, which is disclosed in greater detail in U.S. Provisional patent application Ser. No. 60/016,052, filed Apr. 23,1996, U.S. patent application Ser. No. 08/680,932, filed Jul., 16, 1996, U.S. patent application Ser. No. 08/682,026, filed Jul. 16, 1996, and U.S. patent application Ser. No. 08/682,029, and a U.S. Pat. No. 5,802,918 entitled Concentric Face-Gear Transmission, Assembly issued Sep. 8, 1998, the disclosures of which are hereby incorporated by reference. The face gear system suitably offers a lightweight and small power transfer system and a high speed reduction ratio, and facilitates driving the counter-rotating rotors in accordance with the present embodiment. The face gear system also suitably includes a plurality of pinion gears to properly index blades 902 to be retracted. Pinions are positioned so that all torque is equally divided among the pinions, as is more completely described in the previously incorporated patent applications.

Power plant 202 supplies torque to rotor system 106. Rotor system 106 comprises any system suitable for providing lift to roadable helicopter 100, such as a conventional rotor, and is suitably driven by power plant 202 via power train 502. Rotor system 106 may include a single rotor-plus-tail rotor, side-by-side, tandem, synchropter, or coaxial rotor system. Referring now to FIGS. 1 and 9A–9E, in the present embodiment, rotor system 106 comprises a dual, coaxial rotor having two rotors 116A, 116B positioned one above the other and rotating about a common axis in opposite directions. Rotor system 106 is suitably directly mounted on rotor trunnion 602. Each rotor 116A–B includes multiple blades 902, for example two, which are suitably configured to teeter with respect to the rotor shaft and react according to pilot controls and automated flight controls to control roadable helicopter 100 in flight. Each blade 902 is mounted on a rotor mast 904A, 904B, for example with a hinge. Each rotor mast 904A–B is suitably tilted forward to allow vehicle body 102 to fly level while rotor system 106 is tilted forward to produce thrust with minimal flapping of blades 902 (i.e., the up-and-down motion that a rotor blade exhibits as it rotates around the mast under influence of airloads) relative to masts 904A–B. Minimal flapping is desired to minimize vibrations and increase the life of the hinges that attach blades 902 to rotor masts 904A–B. Inner mast 904A supporting upper rotor 116A is suitably disposed concentrically within outer mast 904B, which supports lower rotor 116B.

Preferably, rotor system 106 is configured to minimize vibration transferred to vehicle body 102. For example, blades 902 of rotors 116A–B are suitably phased so that when one rotor's 116A blades are aligned along the longitudinal axis of vehicle body 102, other rotor's 116B blades are situated perpendicularly to the first rotor's 116A blades in an arrangement to minimize rotor-induced vibrations. In addition, rotor system 106 suitably further incldes passive or active vibration dampening devices to further reduce vibrations transmitted to vehicle body 102. Any suitable configuration for minimizing vibrations, however, may be used.

Figure 11:
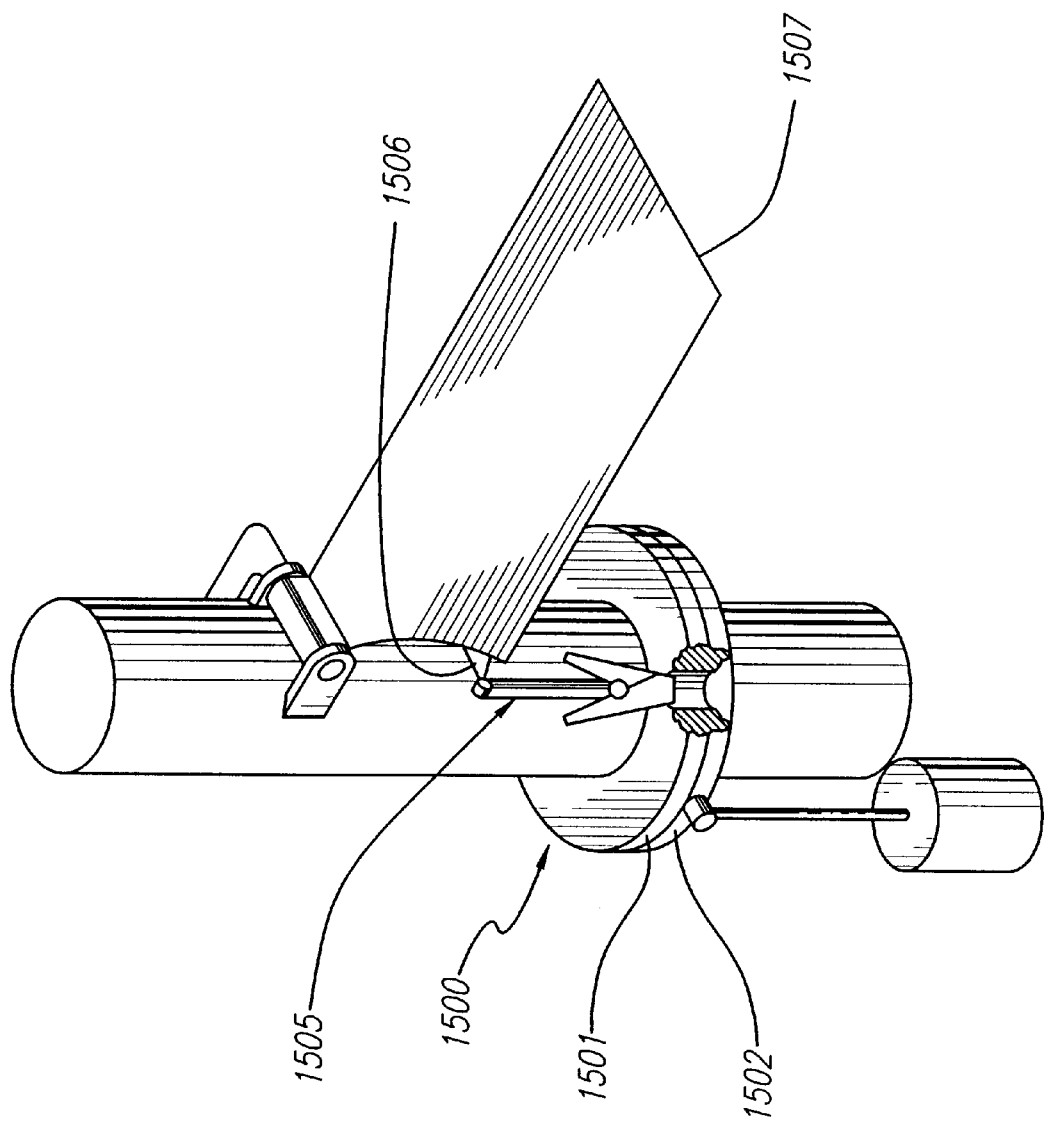
FIG. 11 is a perspective view of a rotor and actuator assembly for an embodiment of a roadable helicopter.

Roadable helicopter 100 further includes guidance systems to control the flight of roadable helicopter 100. In the present embodiment, guidance systems suitably comprise conventional actuators for controlling the pitch of the rotor blades in response to pilot or SCN system signals. In particular, referring now to FIGS. 8 and 11, guidance systems suitably include three dual redundant powered cyclic/collective pitch (only one is shown) actuators 1550, suitably controlled by a fly-by-wire or fly-by-light system, which are mounted on the sides of power transfer system 702 to operate a blade pitch control system, and a fourth actuator 1552 suitably positioned in the center of the power transfer system 702, to operate the differential collective pitch mechanism. Further, guidance systems include a primary swashplate 1500 and a secondary swashplate 1509. Other appropriate configurations for the guidance systems, however, may be effectively utilized. Collective and cyclic actuators force swashplates 1500, 1509 to move up and down as well as to tilt. Two halves 1501, 1502 of primary swashplate 1500 are connected together by a bearing 1512 to allow top half 1501 to rotate while lower half 1502 does not rotate. A pitch link 1505 transfers primary swashplate 1500 vertical motion to a pitch horn 1506 on blade 902B thereby causing blade 902B to change its pitch about its feathering axis. Primary swashplate 1500 and secondary swashplate 1509 are suitably rigidly linked by a second pitchlink 1505B so that if primary swashplate 1500 slides up or down, all blades 902 change pitch together, which is referred to as collective pitch change. If swashplates 1500, 1509 tilt, the blades change pitch cyclically once per revolution.

Figure 8:
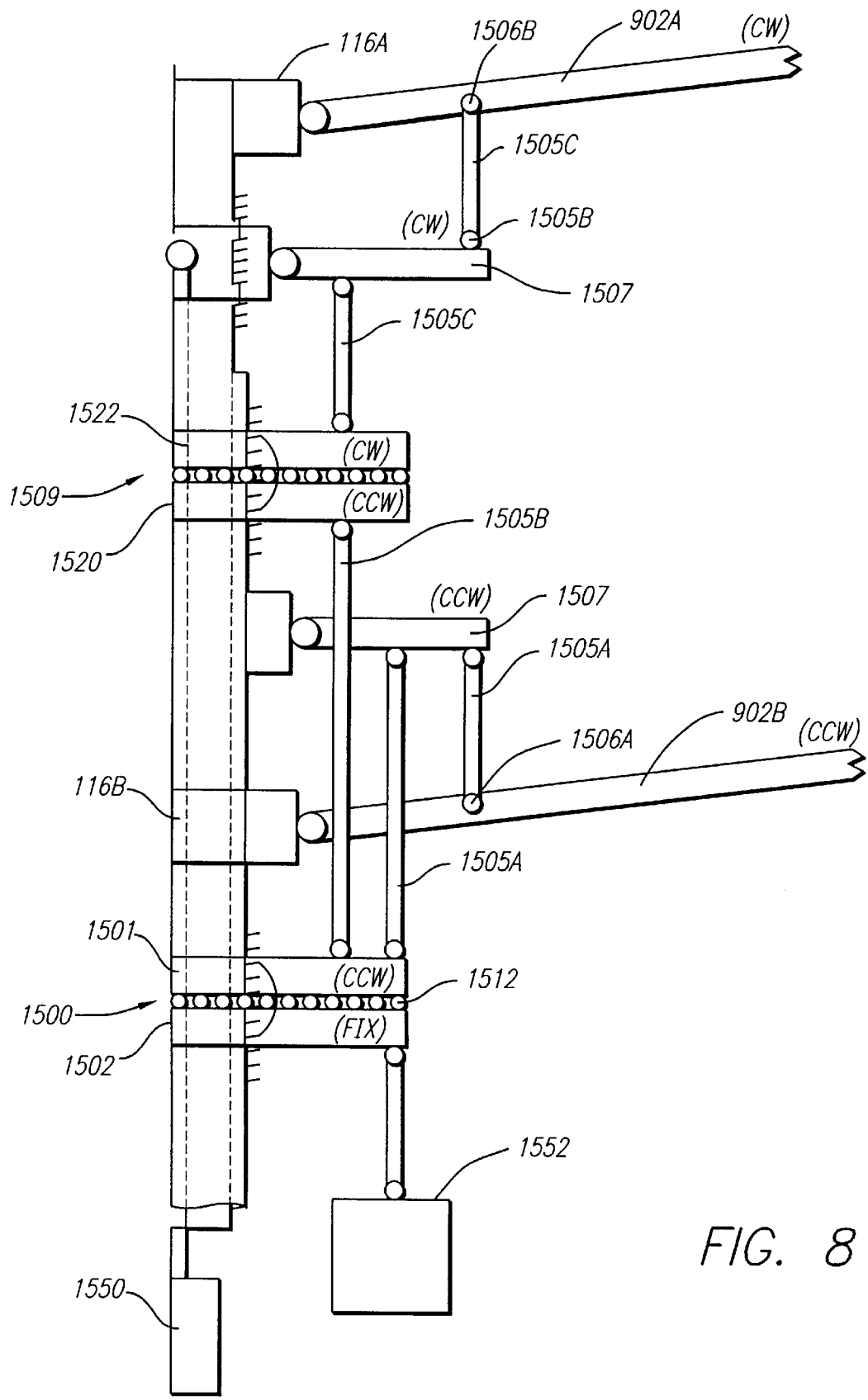
FIG. 8 is an elevational diagram of a flight control system with actuators for the roadable helicopter of FIG. 1.

With reference to FIG. 8, primary swashplate 1500 responds to the actuators as described above. To minimize the height of a mechanism, pitch links 1505A go up to the spider 1507 for lower rotor 116B and back down again to pitch horns 1506A on lower rotor 116B. Another set of pitch links 1505B, 1505C goes up to secondary upper swashplate 1509 to make it tilt and rise-and-fall in parallel with primary swashplate 1500. A lower half 1520 of secondary upper swashplate 1509 turns with lower rotor 116B and an upper half 1522 of secondary swashplate 1509 turns in the opposite direction with upper rotor 116A. Linkages, commonly referred to as drag lines, which are common to helicopter rotors and are not shown, are articulated to keep swashplates 1500, 1509 turning properly as they tilt and rise-and-fall.

Pitch links 1505A–B extend up from primary swashplate 1500 to the spider 1507 for the differential collective and then further extend to pitch horns 1506B of upper rotor blades 902A. A peculiarity of coaxial rotors is that while differential torque can be generated between two rotors 116A, 116B for steering by applying differing amounts of collective pitch to the rotors, this effect reverses between power-on (during normal flight) and power-off or autorotation (during descent). This effect is handled by differential collective actuator 1552 by moving the root end of the spider 1507 for differential collective to effect this differential effect. Software in the SCN system suitably operate this function.

Figure 9A:
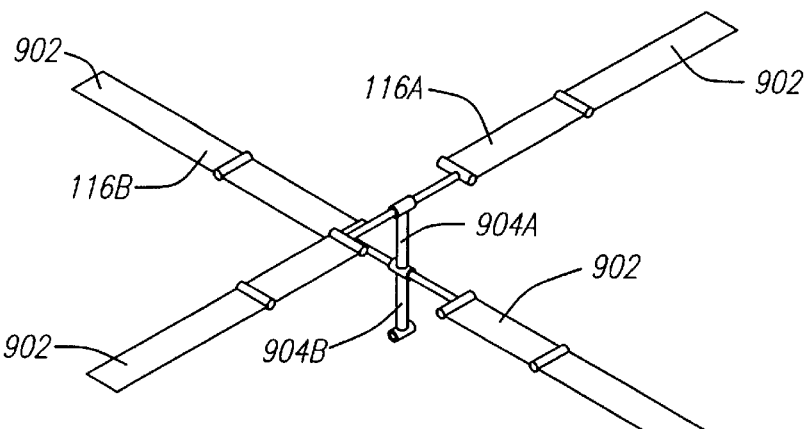
FIGS. 9A–9E are diagrams of a method and apparatus for folding and orienting the coaxial rotors of the rotor system.
Figure 9B:
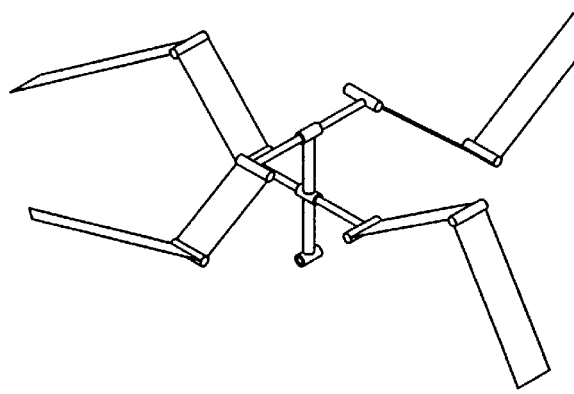
Figure 9C:
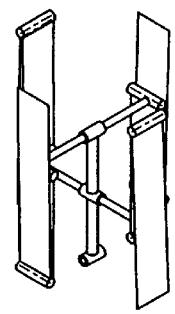
Figure 9D:
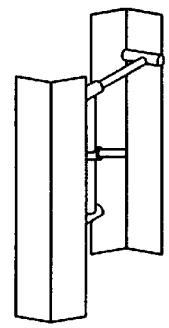
Figure 9E:
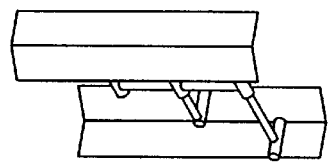

As previously noted, rotor system 106 is suitably configured to retract into rotor bay 206 while roadable helicopter 100 is in road configuration. Any suitable apparatus and method for retracting rotor system 106 into rotor bay 206 may be used, for example folding blades 902 in the chordwise direction. In the preferred embodiment, however, blades 902 initially fold in the flapwise direction as shown in FIG. 9B. Electrically operated "power hinges" are suitably used for folding blades 902, although hydraulic rotary actuators or any other suitable actuator may be used instead. Slip rings disposed in rotors masts 904A–B suitably deliver power to actuators. Rotor blades 902 preferably fold such that the ends of the folded blades 902 are substantially coplanar (FIG. 9C). When blades 902 are folded, rotor masts 904A,B suitably rotate so that a side of an upper blade 902A is adjacent to a lower blade 902B (FIG. 9D). In order to achieve the fully retracted position illustrated in FIG. 9E. However, the entire rotor assembly is first suitably turned using an azimuth drive motor (not shown). The azimuth drive motor then makes a differential rotation of the rotor assembly. After blades 902 are folded and rotated by azimuth motor, the entire assembly comprising transmission, rotor, and control systems may be rotated about the rotor trunnion axis. Rotor trunnion 602 then suitably pivots in the aft direction to lower rotor system 106 into rotor bay 206. Supports (not shown) are suitably provided within rotor bay 206 to hold blades 902 in place when rotor system 902 is retracted. Doors of rotor bay 206 then suitably close to enclose rotor system 106.

Figure 10A:
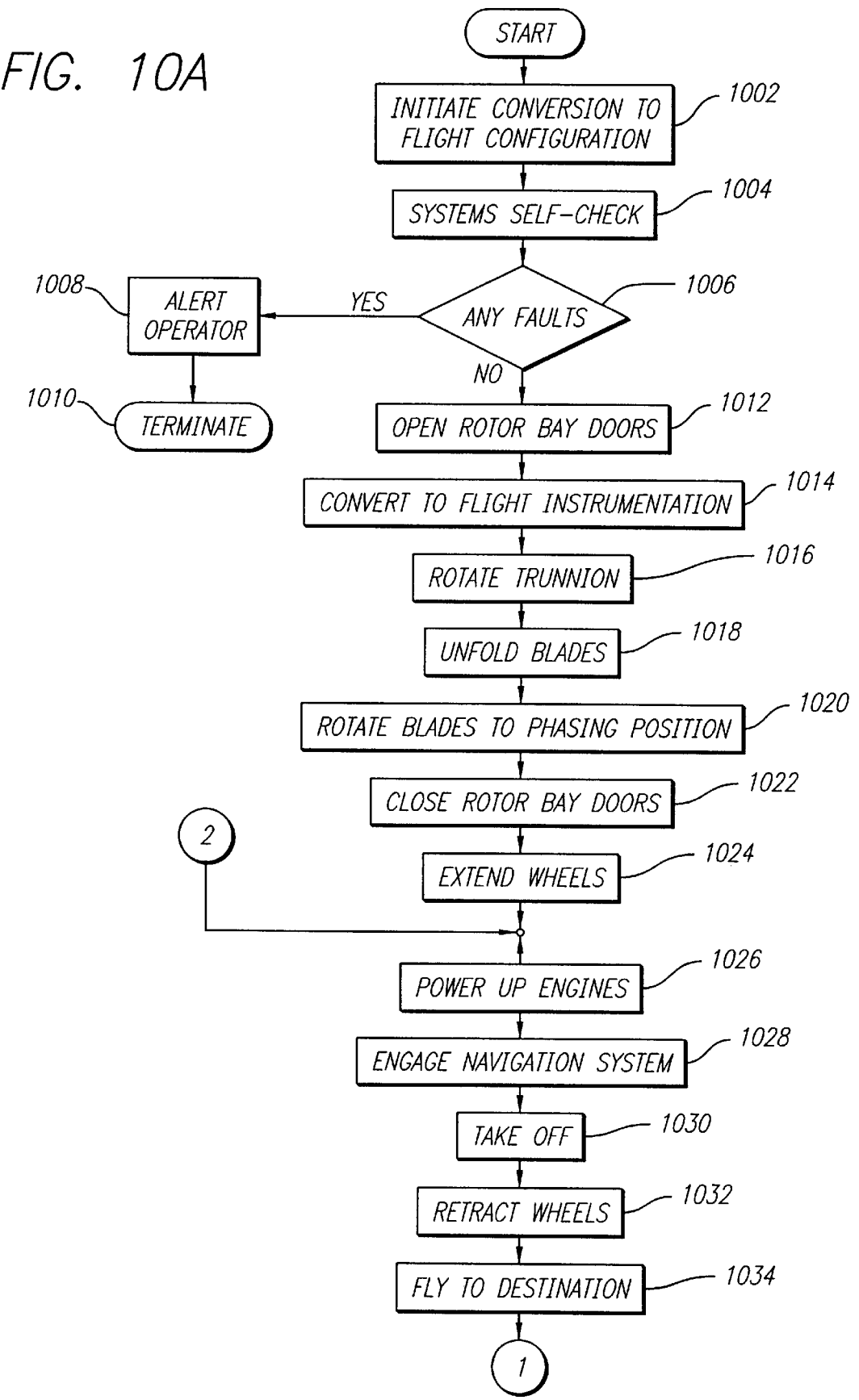
FIGS. 10A–B are flow diagrams of a process for converting the roadable helicopter from road configuration to flight configuration, and then again to road configuration.
Figure 10B:
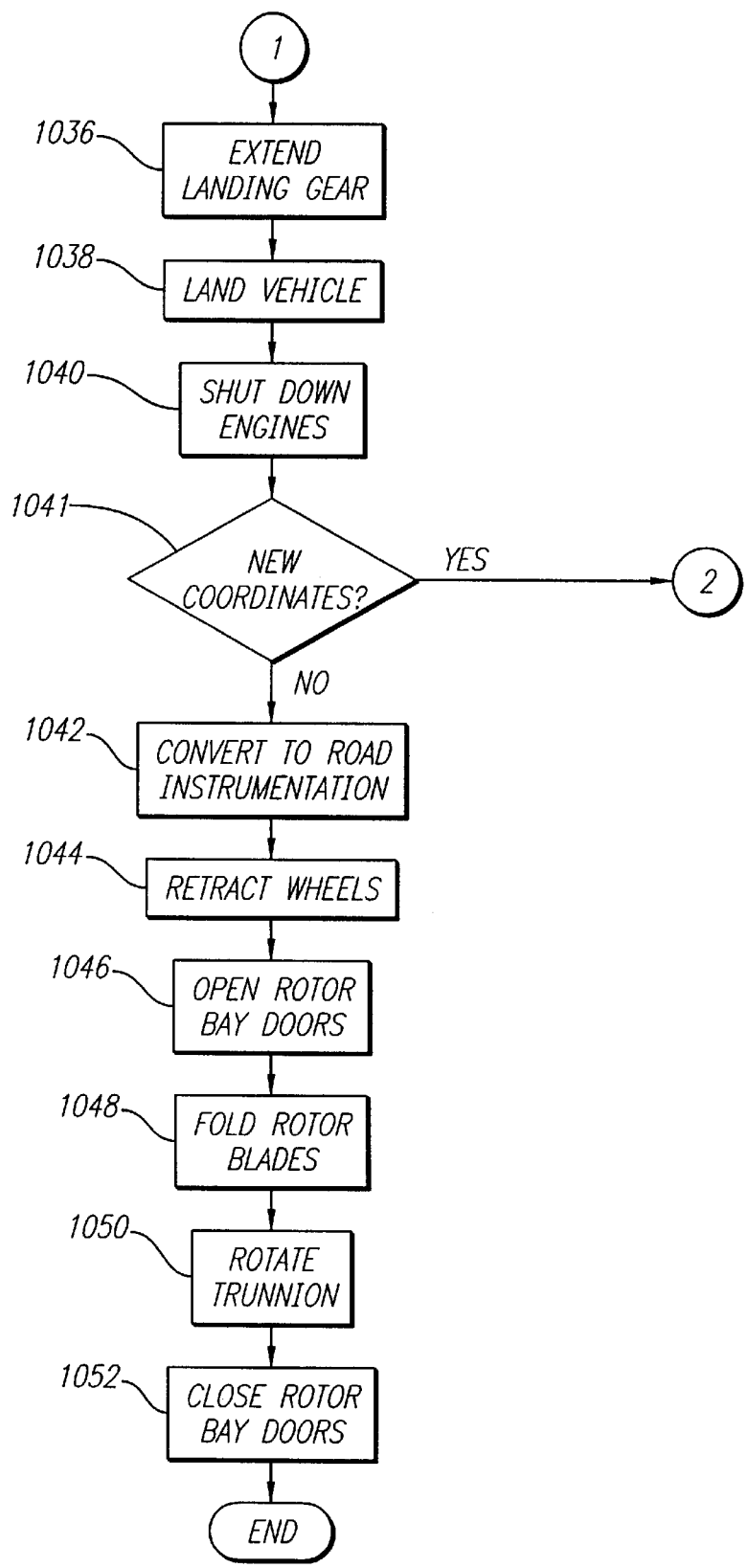

Referring now to FIGS. 10A–B, roadable helicopter 100 suitably complies with a conversion protocol for converting roadable helicopter 100 from road configuration to flight configuration, and vice versa. The conversion protocol preferably includes various interlocks which prevent conversion from one configuration to the other if the status of selected systems indicates that conversion may be unsafe.

In an exemplary embodiment, the conversion operation is initiated by a switch, button, or similar control in passenger cabin 208 (step 1002). For example, as described above, the driver/pilot suitably moves the configuration selector to FLIGHT CONFIGURATION. The pilot then suitably enters a destination or a set of waypoints for a flight path into the SCN system.

After the flight path is entered, roadable helicopter 100 then suitably converts to road configuration automatically. Roadable helicopter 100 suitably performs a self check for all systems needed for flight configuration (step 1004). For example, the system self check determines whether either engine 220 is running, rotors 116 are filly extended, the rotor brake is disengaged, the wheel brakes are disengaged, and the like. In addition, to prevent flight after receiving any structural or mechanical damage in road configuration, a condition-sensing system checks appropriately placed accelerometers, strain gauges, crack-indicating devices, and the like to determine whether roadable helicopter 100 is structurally or systemically safe to fly. If not safe, the computer automatically disables all of the flight systems until the craft can be brought back to a flyable status by a qualified mechanic. Thus, if any of the systems checked are not functioning or properly engaged (step 1006), the pilot is informed of the cause (step 1008) and the conversion process terminates (step 1010).

If all of the systems are functioning properly, rotor bay 206 doors automatically open to expose rotor system 106 (step 1012). In addition, all of the instruments in passenger cabin 208 automatically convert to flight configuration (step 1014). Trunnion mount 606 rotates rotor system to flight position (step 1016), and rotor blades 902 unfold (step 1018). When blades 902 are unfolded, blades 902 are locked in position, and rotors 116 rotate to a selected position to initiate the selected type of rotor phasing (step 1020).

When rotors 116 are in position, rotor bay 206 doors automatically close (step 1022). Front wheels 404 suitably extend to place roadable helicopter 100 in takeoff position (step 1024), and engines 220 are powered up (step 1026). Preferably, each engine 220 is started individually. As engines 220 are turned on, rotor 116 begins to rotate and accelerates to a rotational speed sufficient to facilitate flight. The SCN system is engaged (step 1028), the roadable helicopter 100 lifts off (step 1030), and landing gear 104 automatically retracts (step 1032). While roadable helicopter 100 is airborne, it is automatically guided towards its destination by the automatic flight guidance system associated with the SCN system. Roadable helicopter 100, if equipped with a conventional pilot's manual controls for flying a helicopter, may be also equipped with a manual override switch so that the pilot may elect to manually guide roadable helicopter 100.

As roadable helicopter 100 approaches its destination (step 1034), landing gear 104 extends into the landing position (step 1036). Roadable helicopter 100 automatically lands at the appropriate destination (step 1038). After landing, the engines shut down (step 1040) and rotors slow to a stop. At this point, the driver of roadable helicopter 100 resumes control of roadable helicopter 100. The driver may either enter new coordinates for flight, which causes the takeoff process to reinitiate, or return roadable helicopter 100 to road configuration (step 1041). If the configuration selector switch is set to return the vehicle to road configuration, all controls, instruments, radios, and lighting functions return to road configuration (step 1042). Front wheels 404 of landing gear 104 retract to road position (step 1044), the doors of rotor bay 206 open (step 1046), and rotors 116 turn to proper azimuth and retract according to the reverse of the process described above (step 1048). Rotor trunnion 602 rotates to lower folded blades 902 into rotor bay 206 (step 1050). When rotors 116A,B are fully retracted and rotor bay 206 doors closed (step 1052), roadable helicopter 100 is again ready for road travel. The driver may then start engine 220, use the transmission gearshift lever to select the appropriate gear, and proceed to drive roadable helicopter 100 like an automobile.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements which may be made without departing from those principles.

I claim:

1. A roadable aircraft having a road configuration and a flight configuration, comprising:
    a vehicle body having a rotor bay; and
    a rotor assembly, wherein said rotor assembly is configured to automatically retract into said rotor bay when the roadable aircraft is in the road configuration and extend from the vehicle body when said roadable aircraft is in the flight configuration, wherein said rotor assembly includes no more than two rotors, said two rotors comprising:
        a first rotor having a plurality of blades configured to rotate around a rotor axis in a first direction;
        a second rotor having a plurality of blades disposed coaxially and above said first rotor, wherein said second rotor is configured to rotate around said rotor axis in a second direction opposite to said first direction, and wherein said first and second rotors are configured in the road configuration to fold into said rotor bay;

a plurality of wheels mounted on the bottom of said vehicle body configured to support the roadable vehicle on the ground, wherein said plurality of wheels are configured to be least partially retractable into said vehicle body;

a power plant configured to rotate said first and second rotors when the roadable aircraft is in the flight configuration and drive at least one of said wheels when the roadable aircraft is in the road configuration, wherein said power plant comprises at least two engines and only one of said engines is configured to drive said at least one of said wheels when the roadable aircraft is in the road configuration;

a computer system configured to affect automatic transformation of the roadable aircraft from said road configuration to said flight configuration and from said flight configuration to said road configuration.

2. The roadable aircraft of claim 1, further comprising an automatic control system configured to maintain the stability of the roadable aircraft in the flight configuration, wherein:

said automatic control system is configured to automatically control the navigation of the roadable aircraft in the flight configuration from a starting point to a destination;

said automatic control system includes a memory configured to store information relating to at least one obstacle, and wherein said automatic control system is configured to access said memory and automatically navigate the roadable aircraft around said at least one obstacle; and said automatic control system includes a global positioning system receiver.

3. The roadable aircraft of claim 2, wherein said automatic control system includes a communications system configured to communicate with at least one other aircraft and automatically navigate the roadable aircraft to avoid collisions with said at least one other aircraft.

4. The roadable aircraft of claim 2, wherein each of said first and second rotors includes a plurality of blades having adjustable pitch, the roadable aircraft further comprising:

an actuator system comprising a fly-by-wire control system comprising a cyclic pitch control system and a collective pitch control system, said cyclic pitch and collective pitch control systems operating through a swashplate to provide a differential level of collective pitch to said first and second rotors.

5. The roadable aircraft of claim 1, further comprising a face gear rotor transmission configured to transfer power from said power plant to said first and second rotors.

6. The roadable aircraft of claim 1, further comprising an azimuth drive motor configured to rotate said first and second rotors into position to fold into said rotor bay.

7. A method of converting a roadable aircraft between a road configuration and a flight configuration, the roadable aircraft including a set of instruments configurable for the road configuration and the flight configuration, a rotor assembly, comprising the steps of:

monitoring a plurality of readiness conditions of the aircraft for readiness to convert;

sensing for structural damage;

disallowing conversion into flight configuration if significant structural damage is sensed or one of said readiness conditions of the aircraft is unfulfilled;

converting the instruments of the aircraft from road configuration to flight configuration;

extending the rotor assembly from a folded position to an extended position;

engaging a control system, wherein said control system is configured to maintain the roadable aircraft's stability while airborne;

retracting the rotor assembly from said extended position to said folded position;

disengaging the control system; and converting the instruments of the aircraft from flight configuration to road configuration.

8. The roadable aircraft of claim 1, wherein:

said first and second rotors are configured to rotate in the helicopter configuration through a first and second plane, respectively, wherein said first and second planes are disposed at an angle with respect to the plane of the ground when the roadable aircraft is in the road configuration; and said plurality of wheels includes at least one front wheel and at least one second wheel, wherein said at least one front wheel is configured to extend away from said vehicle body so that said first and second planes are disposed substantially parallel to the ground when the roadable aircraft is in the configuration for take-off or landing.

9. The roadable aircraft of claim 1, further comprising an active shock absorbing system mounted on said vehicle body and configured to operate through said plurality of wheels and actively compensate for said shock to diminish a transfer of said shock from said plurality of wheels to said vehicle body thereby inhibiting ground resonance when the rotors are operating while the helicopter is on the ground and serving as energy absorbers during hard vertical landings.

10. A roadable helicopter having a road configuration wherein the roadable helicopter is configured to operate in a manner analogous to an automobile and a flight configuration wherein the roadable helicopter is configured to operate in a manner analogous to a helicopter, comprising:

a vehicle body, including a rotor bay formed in a rear and a top portion of said vehicle body, wherein said rotor bay includes an opening formed in a top portion of said rotor bay, and further includes at least one door mounted on said top portion of said rotor bay adjacent said opening;

a dual coaxial rotor assembly, including:

first rotor mounted on a first mast and configured to rotate around an axis in a first direction;

a second rotor mounted on a second mast concentric with said first mast, wherein said second rotor is configured to rotate around said axis in the opposite direction of said first direction, and wherein said second rotor is disposed directly above said first rotor, wherein said first and second rotors are configured in an extended mode when the roadable helicopter is in flight configuration and in a retracted mode when the roadable helicopter is in the road configuration; and a rotor mount pivotably mounted on said vehicle body within said rotor bay, wherein said rotor mount is configured to support said first and second rotors, to pivot said first and second rotors forward with respect to said vehicle body when the roadable helicopter is in the flight configuration and said rotors are in said extended mode, and to pivot said rotors rearward with respect to said vehicle body when the roadable helicopter is in the road configuration and said rotors are in the folded mode so that said rotors are disposed within said rotor bay; and a control system connected to said first and second rotors, comprising:

an automatic stability control system configured to control said first and second rotors and maintain a stability of the roadable helicopter in flight configuration;

an automatic navigation system, including a global positioning system receiver, configured to control said first and second rotors to automatically guide the roadable aircraft in flight configuration to a destination according to signals received by said global positioning system receiver; and a communications system configured to communicate with at least one other aircraft and automatically navigate the roadable aircraft to avoid collisions with said at least one other aircraft.

11. The roadable helicopter of claim 10, further comprising a landing gear assembly mounted on the bottom of said vehicle body.

12. The roadable helicopter of claim 11, wherein said landing gear assembly comprises a plurality of wheels.

13. The roadable helicopter of claim 12, further comprising a power plant, wherein said power plant is configured to rotate said first and second rotors in the flight configuration and at least one of said plurality of wheels in the road configuration.

14. The roadable helicopter of claim 13, wherein said dual coaxial rotor assembly includes a face gear, wherein said power plant is configured to drive said face gear in the flight configuration, and said face gear is configured to transfer power from said power plant to said first and second rotors.

15. The roadable helicopter of claim 11, wherein said landing gear assembly includes a forward portion and an aft portion, wherein said forward portion is configured to extend away from said vehicle body when said first and second rotors are in said extended mode.

16. The roadable aircraft of claim 1, wherein each of said rotors includes only two blades, and said rotation of said rotors is configured in flight configuration so that said rotor blades are disposed substantially perpendicular to each other when said blades are aligned parallel to the central front-to-rear axis of said vehicle body.

17. The roadable aircraft of claim 1, wherein said rotor blades fold in a flapwise direction when the roadable aircraft is in road configuration.

18. The roadable helicopter of claim 10, wherein said control system further comprises a differential collective pitch actuator system configured to simultaneously adjust the pitches of the first and second rotors by a first and second amount, respectively, wherein said first amount is different from said second amount.

19. A method of converting a roadable aircraft between a road configuration and a flight configuration, the roadable aircraft including a set of instruments configurable for the road configuration and the flight configuration, a rotor assembly, comprising the steps of:

monitoring a plurality of readiness conditions of the aircraft for readiness to convert;

terminating the conversion if one of said readiness conditions of the aircraft is unfulfilled;

converting the instruments of the aircraft from road configuration to flight configuration;

extending the rotor assembly from a folded position to an extended position;

engaging a rotor control system while performing said converting step, wherein said rotor control system is configured to maintain the roadable aircraft's stability while airborne;

retracting the rotor assembly from said extended position to said folded position;

disengaging the rotor control system;

engaging an automobile control system; and converting the instruments of the aircraft from flight configuration to road configuration.

20. The method of claim 19, further comprising the step of entering a destination into said control system, wherein said control system is further configured to automatically navigate the aircraft to said destination in accordance with a flight track, wherein said flight track may be reprogrammed during flight.

21. The method of claim 19, wherein said step of extending the rotor assembly includes the steps of:

opening a door of a rotor bay, wherein the rotor bay encloses the rotor assembly;

pivoting the rotor assembly out of said rotor bay; and unfolding the rotor assembly from said folded position to said extended position.

22. The method of claim 19, wherein said rotor assembly is folded in the flapwise direction in said folded position.

23. The method of claim 19, wherein the roadable aircraft includes a landing gear assembly, further comprising the step of extending the landing gear assembly so that the rotor assembly is level.

* * * * *